C. G. ARMSTRONG.
HEATING SYSTEM.
APPLICATION FILED JULY 29, 1901.
1,056,143.
Patented Mar. 18, 1913.
2 SHEETS—SHEET 1.
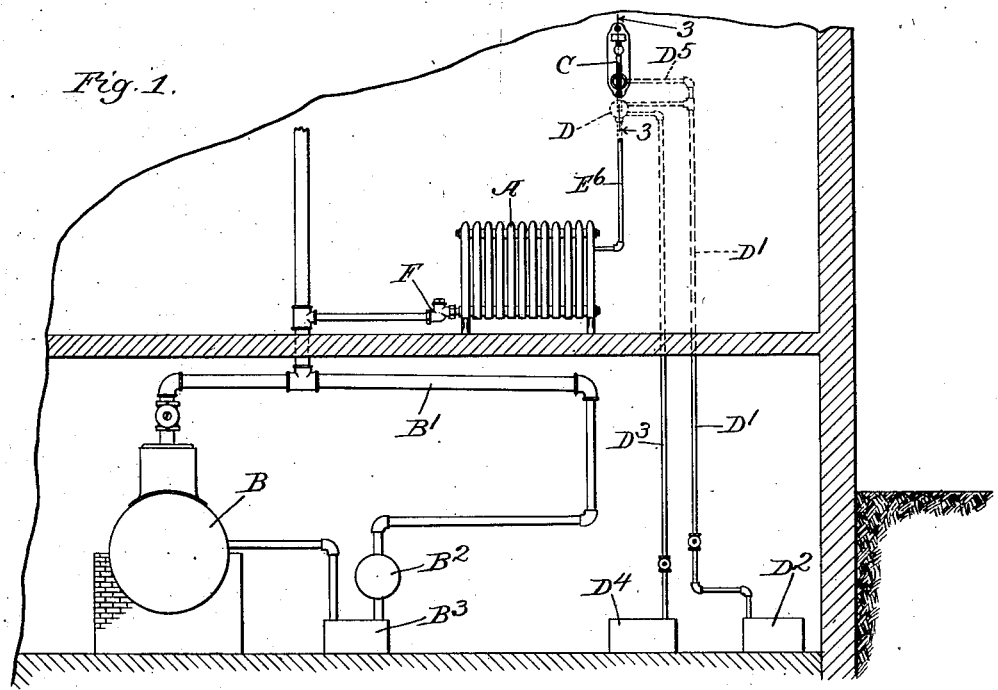
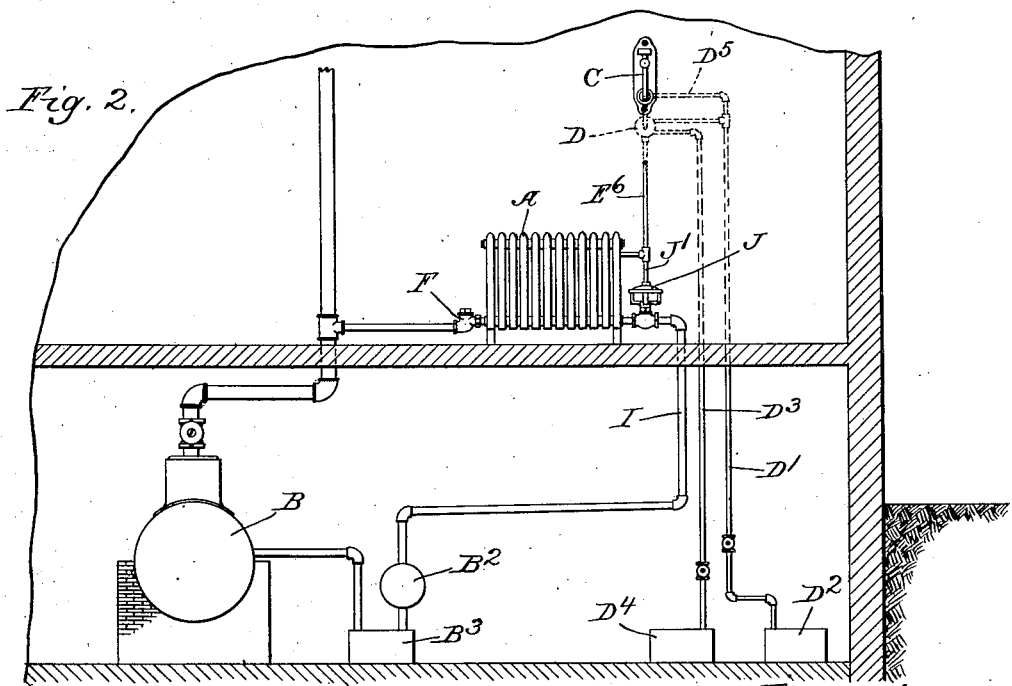
Witnesses,
Edward F. Wray.
Homer L. Kraft.
Inventor,
Charles G. Armstrong
by Parker & Carter
Attorneys.

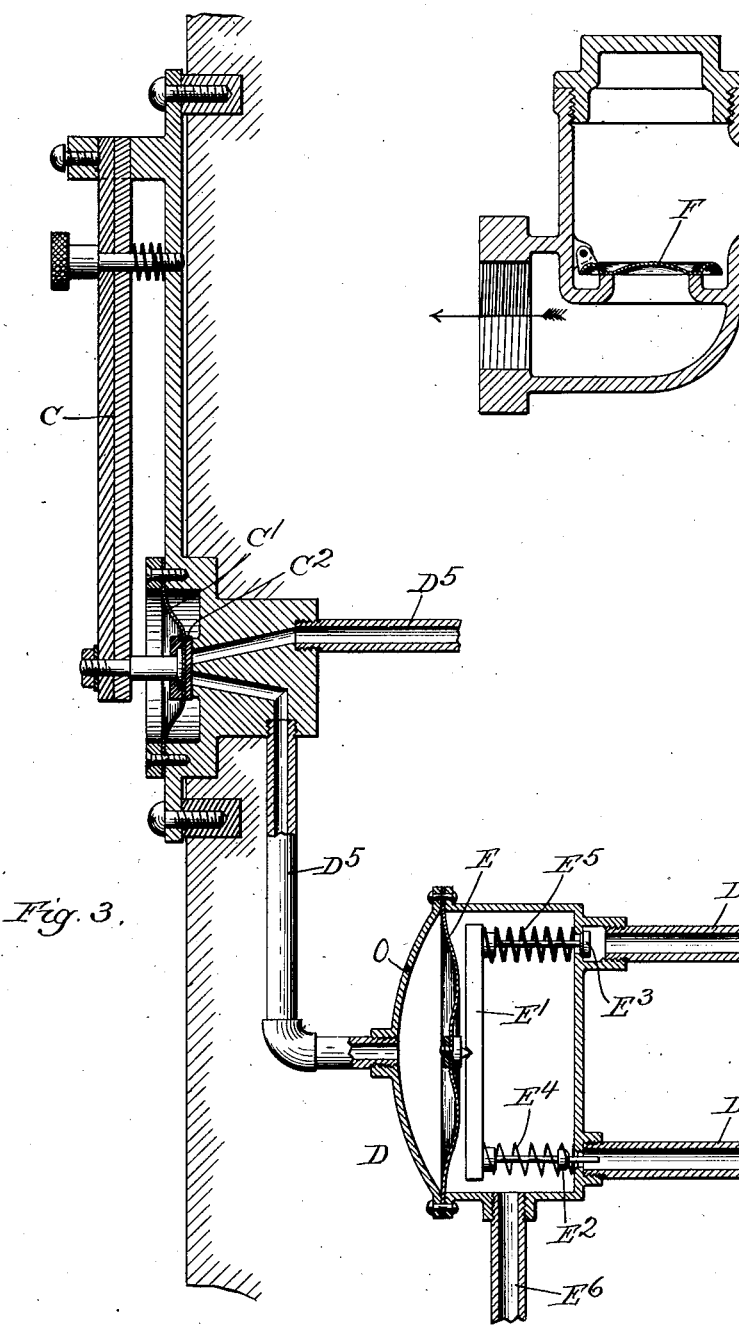
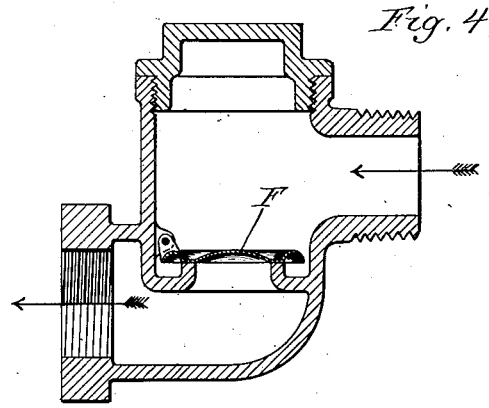

UNITED STATES PATENT OFFICE.

CHARLES G. ARMSTRONG, OF CHICAGO, ILLINOIS, ASSIGNOR, BY MESNE ASSIGNMENTS, TO AUTOMATIC HEATING COMPANY, OF JERSEY CITY, NEW JERSEY, A CORPORATION OF NEW JERSEY.

HEATING SYSTEM.

1,056,143. Specification of Letters Patent. Patented Mar. 18, 1913.

Application filed July 29, 1901. Serial No. 70,052.

*To all whom it may concern:*

Be it known that I, CHARLES G. ARMSTRONG, a citizen of the United States, residing at Chicago, in the county of Cook and State of Illinois, have invented a certain new and useful Improvement in Heating Systems, of which the following is a specification.

My invention relates to heating systems and has for its object to provide an improved heating system and controlling devices therefor, of which the following is a description, reference being had to the accompanying drawings, wherein—

Figure 1 is a diagrammatic view showing an improved single-pipe heating system embodying my invention; Fig. 2 is a diagrammatic view showing my invention applied to a two-pipe heating system; Fig. 3 is an enlarged sectional view on line 3—3, Fig. 1, showing in a diagrammatic manner the construction of the controlling valves for the air or other regulating fluid; Fig. 4 is a sectional view of the valve inserted between the heater and the source of supply of the heating fluid.

Like letters refer to like parts throughout the several figures.

My present invention is particularly adapted to be used in connection with steam heating systems. In designing such heating systems, it is the practice to make the heater or radiator with sufficient heating or radiating surface to properly heat the apartment during the most severe weather. As the entire capacity of the radiator is seldom necessary, it follows that there is a great waste in all such systems and great difficulty in keeping the temperature of the apartment at the right point.

One of the objects of my invention is to provide a heating system in which the heating capacity or the radiating surface of the heater or radiator may be satisfactorily and efficiently varied to correspond with the need of the apartment to be heated.

I have illustrated my invention in a diagrammatic manner and have shown certain particular constructions by means of which my invention may be carried into practice. I wish it to be understood, however, that I do not limit myself to the construction and arrangement illustrated, as various constructions and arrangements may be used which will embody my invention and some of the parts may be omitted and others used with parts not herein shown, without in any manner departing from the spirit of my invention.

Referring now to the drawings, I have illustrated in Fig. 1 a single-pipe heating system embodying my invention. In this view, I have only illustrated one heater or radiator, but it will be understood that any number of radiators and associated devices may be used in one system and connected with the same source of supply of the heating fluid. In this view a heater or radiator A is connected to the source of supply B of the heating fluid, which may be a boiler or any other device. There is associated with each heater or radiator means for inserting therein a displacing fluid such as air and for confining the heating fluid in the radiator while such displacing fluid is being inserted. As illustrated in Fig. 1, I have shown means for automatically performing these functions, the device being responsive to variations in temperature in the apartment to be heated, and for also withdrawing the displacing fluid from the heater or radiator when the temperature falls below a predetermined point. For purposes of illustration, I have shown a thermostat C, which controls a valve D, adapted to connect the radiator A with some suitable source of supply of displacing fluid $D^2$ and to also connect the radiator with a withdrawing or exhaust device, or means for withdrawing such fluid. It is of course evident that the source of supply of such fluid is immaterial and that any source may be used and that any suitable exhaust or withdrawing means may also be used. As herein illustrated, the controlling valve D is connected by pipe $D^1$ with a source of supply of displacing fluid, which may be the air pump $D^2$ or a reservoir or any other source. Said valve D is also connected by a pipe $D^3$ with a withdrawing device $D^4$, which may be a vacuum pump or a reservoir, in which the pressure is lower than the pressure in the radiator, or any other means by which the withdrawal may be accomplished. The controlling valve D may be directly actuated by the thermostat, but I prefer to use the thermostat simply to control the actuating device for such valve.

Referring now to Fig. 3, in which I have shown diagrammatically the thermostat and controlling valve, I provide a pipe D⁵ connected with a source of air supply, said pipe being controlled by the thermostat and leading to the controlling valve D. To facilitate the control of the air through this pipe to the controlling valve, I prefer to provide a flexible diaphragm C¹, which either directly controls the passage of the air through this pipe or is connected with some part, such as the part C², which becomes the effective controlling part. This diaphragm and the parts associated therewith may be termed the thermostat-valve. The controlling valve D may be constructed in any desired manner. As herein shown, I provide a diaphragm E, which is actuated by the air passing through the thermostat-valve. Associated with this diaphragm is a connecting piece E¹, which connects the valves E² and E³. The valve E² opens inwardly and controls the pipe D³ leading to the withdrawing device, source of vacuum or the like, and is provided with a seating spring E⁴. The valve E³ opens outwardly and controls the pipe D¹ leading to the source of supply of the displacing fluid. Said valve E³ is provided with the seating spring E⁵. A pipe E⁶ connects the controlling valve with the radiator. Located at some point between the radiator and the source of supply of the heating fluid is a valve F, adapted to admit the heating fluid into the radiator, but to be closed when the air is introduced into the radiator so as to confine the heating fluid and air in such radiator. Any suitable valve to accomplish this purpose may be used. One form of this valve, which may be called the heater or radiator valve, is illustrated in Fig. 4. This valve opens toward the radiator and Fig. 4 shows an automatic valve, which automatically opens to let steam into the radiator and to let the water of condensation pass out of such radiator. As herein illustrated the valve F opens toward the radiator and hence is opened by the steam pressure in the supply pipe and not by the floating power of the water of condensation but is in fact independent of such water of condensation and is so arranged that when the difference in pressure on the two sides is sufficient, for example, to open the valve the steam can pass into the radiator and the water of condensation can pass out, both passing the valve simultaneously.

I have illustrated in Fig. 1 a system wherein the water of condensation is returned to the boiler B, such water passing through the pipes B¹ and into the receiver B² and then being pumped back into the boiler by the pump B³. It is of course evident that this arrangement is immaterial and may be varied to suit the conditions met with.

In Fig. 2, I have shown a system similar in all respects to Fig. 1, except that each radiator is provided with a return pipe I. When this return pipe is used, it is necessary, or at least desirable, to insert in such pipe a valve adapted to be closed when air is being forced into the radiator. Any suitable valve for this purpose may be used and I have shown an ordinary diaphragm valve J, which is operated by the air passing through the air pipe J¹ connected with the controlling valve D. In this figure, I have also shown the means of returning the water of condensation to the boiler. The valve F is shown in a horizontal position, but it of course, may be placed in a vertical position or in any angular position between the horizontal and vertical positions.

The use and operation of my invention are as follows: When the system is in operation, the thermostat C is adjusted so as to operate at some given temperature, which of course may be varied as desired. When the steam is first turned on, the thermostat-valve is closed and the controlling valve is in position to connect the radiator with the vacuum pump or withdrawing device. The steam now fills the radiator and then passes out through the controlling valve. This controlling valve is normally located very near the thermostat and the heat from the steam or hot air passing therethrough affects the thermostat and causes it to move and slightly open the thermostat-valve. Air at reduced pressure is then admitted to the diaphragm E due to the slight opening of the thermostat valve, the valve under this condition acting as a reducing valve. The parts of the controlling valve are arranged so that the valve E² is more easily actuated than the valve E³, and hence this air moves the diaphragm E so as to close the valve E² without opening the valve E³. This result may be secured by making the spring E⁵ stronger than the spring E⁴. The connection to the withdrawing device is therefore closed, so that the steam cannot escape. As the temperature in the apartment rises above the predetermined point, the thermostat is given a greater movement so as to let more air pass the thermostat-valve. The increased pressure upon the diaphragm E then opens the valve E³, thus connecting the radiator with the source of air supply. The air then passes into the radiator, and, the pressure being somewhat greater than the pressure of the steam, immediately and automaticlly closes the valve F if said valve should be open so as to confine the steam in the radiator and limit the amount of air that can be inserted therein at the time the valve E³ is opened. The heating area of the radiator is therefore reduced only a small amount, which amount may of course be controlled by controlling the relative pressures of the air and steam.

The steam thus confined in the radiator gradually condenses, thus gradually forming more room for the air and permitting a slow, and what may be termed an intermittent admission of the air. That this admission is gradual or intermittent will be readily seen when it is noted that after sufficient air gets in the radiator to raise the pressure, no more can be forced in, and the admission stops until there is a condensation of steam. There is then another reduction of pressure and another admission of air. It will thus be seen that the air space is slowly and gradually increased, so as to reduce the radiating area. When the temperature in the apartment has been reduced to the desired point, the thermostat-valve is moved so as to be nearly closed and the pressure on the diaphragm E is reduced either by the ordinary leakage or by providing a leak hole O. The spring $E^5$ then closes the valve $E^3$. In this position the radiator is disconnected both from the withdrawing device and the source of air pressure. If now the temperature falls below the predetermined point, the thermostat-valve entirely closes and the pressure on the diaphragm E is reduced until the spring $E^4$ opens the valve $E^2$, thus connecting the radiator with the withdrawing device. The air is then withdrawn from the radiator and the pressure in the radiator falls below the pressure of the steam from the source of supply. This reduction in pressure then immediately causes the valve F, to open so as to permit steam to enter the radiator and so as to also permit the water of condensation to flow back through the valve F so as to flow out of the radiator. It will be seen that this valve F performs a peculiar function. When the air is forced into the radiator, it immediately closes so as to prevent the escape of the steam and the air, and, when the air is withdrawn, it immediately opens so as to permit the steam to flow through it in one direction and the water to flow through it in the other direction. It will further be seen that during this last operation there are two fluids, one of which is responsive to the force of gravity and the other a fluid under pressure responsive to a force which overcomes the force of gravity. It will also be seen that this valve is responsive to pressures and that it acts to prevent the removal of water and steam from the radiator under certain conditions, and yet under other conditions permits the water to be removed and the steam to be admitted. This action may be explained as follows: The area occupied by the steam in the radiator is much greater than the area occupied by the water produced by the condensation of this steam. The pressure in the radiator is much greater when the steam is in such radiator than when it has been condensed to form water. If, now, the radiator is full of steam, and a portion of the steam condenses to form water the pressure in the radiator will be reduced, and a time will come when the pressure of the steam in the admission pipe will be great enough to lift the valve F. The water of condensation will then flow down past the valve, and the steam flow up into the radiator. This action is repeated during the operation of the radiator.

Under ordinary conditions, the thermostat does not immediately respond to a change in the heating capacity or radiating surface of the radiator. My present invention takes this into account and I here provide a construction which operates satisfactorily and efficiently to keep an equable temperature in the apartment and at the same time materially increase the efficiency of the plant and decrease the cost of operating it. By having the steam confined in the radiator by the valve F when connection is made between the radiator and the source of air supply, the evils due to the failure of the thermostat to immediately respond to the varying condition of the radiator are obviated and a practical commercial system is by means of my invention made possible.

In Fig. 2, the operation is substantially the same as hereinbefore described, with the exception that the diaphragm valve J is closed when air is admitted to the radiator and is opened when the air is withdrawn therefrom.

In this system, it will be seen, that there is provided means for varying the pressure in the radiator and that the valve between the radiator and the source of steam supply is controlled by the varying of the pressure within the radiator. The pressure valve F is acted upon directly by the fluid passing through it.

I claim:

1. A steam heating system comprising a radiator, a source of steam supply, a source of air supply, an exhaust device, and conduits leading from the source of steam supply, the source of air supply and exhaust device to the radiator means for controlling the conduits leading from the source of air supply and exhaust device, a non-floating pressure valve, independent of variations in temperature, controlling the conduit between the radiator and source of steam supply, said valve adapted to be closed when the radiator is connected with the source of air supply so as to confine the air, steam and water of condensation in the radiator, and adapted to automatically open when the radiator is connected to the exhaust device so as to permit the entrance of the steam into the radiator through said valve, and the exit of the water of condensation through the same valve.

2. A steam heating system comprising a radiator, a source of steam supply, a source of air supply, an exhaust device and pipes leading respectively from said source of air supply and exhaust device to the radiator, a pressure valve controlling said pipes comprising a casing, a diaphragm in said casing dividing it into two chambers, a connecting piece connected with said diaphragm, two valves connected to opposite ends of said connecting piece, one chamber of said casing being in communication through said pipes with said radiator, said source of air supply, and said exhaust device, said last mentioned valves adapted to control respectively the communications between said chamber and the source of air supply and the exhaust device, a pipe forming communication between the other chamber of said casing and the source of air supply, and an automatically controlled valve controlling said last named pipe.

3. A steam heating system comprising a radiator, a source of steam supply a source of air supply, and an exhaust device, conduits leading from the radiator to said source of steam supply, source of air supply and exhaust device, a non-floating pressure valve responsive to variations in pressure in the radiator and located between the radiator and the source of steam supply, an air operated controlling valve between the radiator and the source of air supply and exhaust device, and an automatic controlling device responsive to variations in the temperature of the apartment to be heated, and adapted to control the admission of air to said controlling valve.

4. A steam heating system comprising a radiator, a source of steam supply, a source of air supply, an exhaust device, conduits leading from the said sources of steam and air supply and exhaust device to the radiator, a pivoted valve, responsive to variations in pressure only, controlling the conduit between the radiator and the source of steam supply, means for controlling the conduit between the radiator and the source of air supply and exhaust device, said valve adapted to be automatically closed when the radiator is connected with the source of air supply so as to confine the air and steam in the radiator, and adapted to automatically open when the radiator is connected to the exhaust device, so as to permit the entrance of the steam and the exit of the water of condensation, in opposite directions, through the same valve.

5. The combination with a steam radiator of a non-floating pressure valve, independent of variations in temperature, opening toward the radiator and responsive to variations in pressure in the radiator, said valve located in the steam connection between the radiator and the source of steam supply, and means for varying the pressure in the radiator so as to control said valve.

CHARLES G. ARMSTRONG.

Witnesses:
  DONALD M. CARTER,
  HOMER L. KRAFT.